United States Patent Office 3,606,036
Patented Sept. 20, 1971

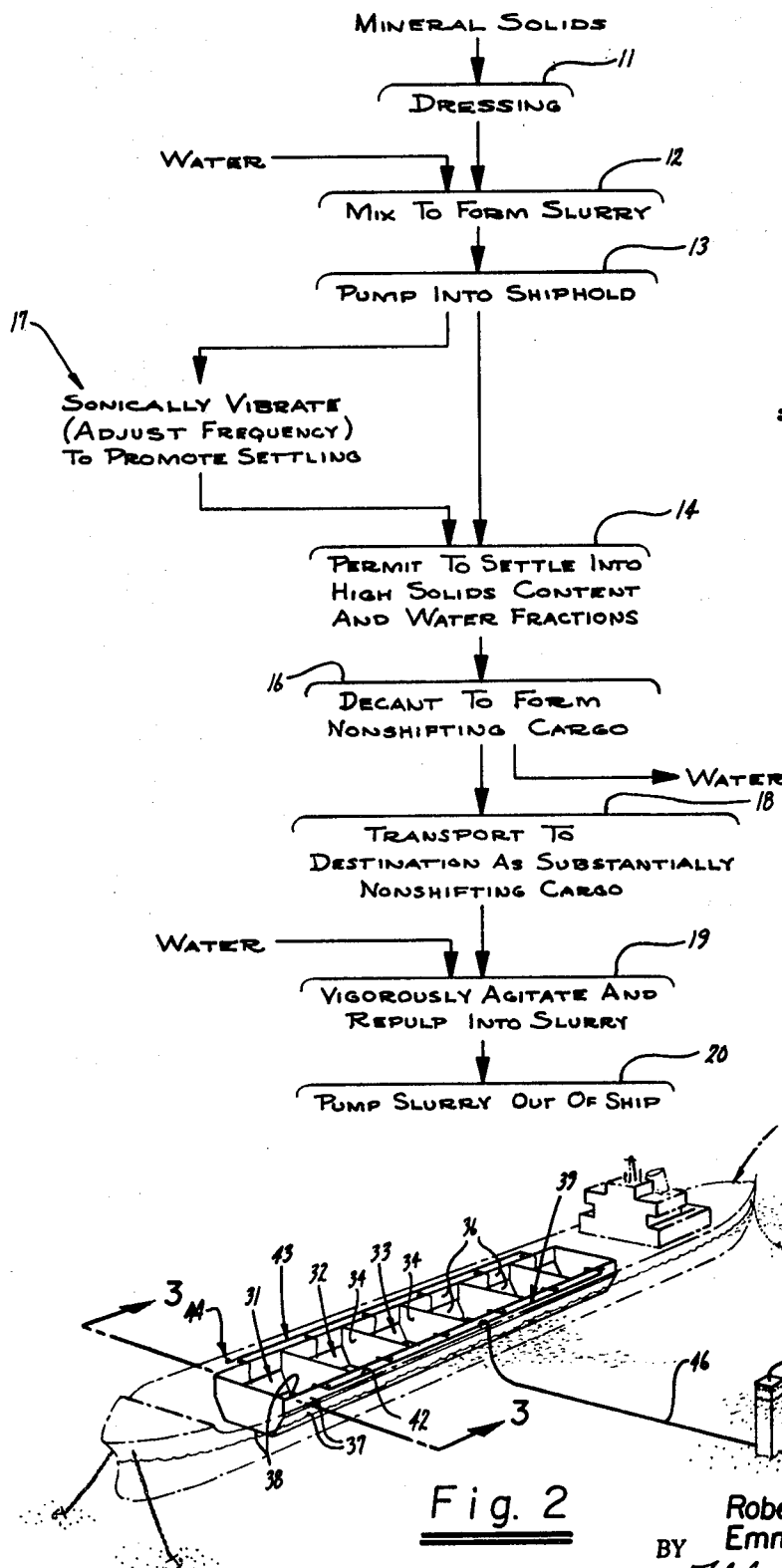

3,606,036
METHOD AND APPARATUS FOR SHIPPING MINERAL SOLIDS AND OTHER PARTICULATE MATTER
Robert R. Beebe, Tiburon, and Emmett J. Murphy, Woodside, Calif., assignors to Marcona Corporation, San Francisco, Calif.
Filed July 31, 1968, Ser. No. 778,364
(Filed under Rule 47(a) and 35 U.S.C. 116)
Int. Cl. B63b 27/24
U.S. Cl. 214—14
10 Claims

ABSTRACT OF THE DISCLOSURE

A method and apparatus for loading, transporting and discharging discrete minerals in ships in which a slurry of the mineral is pumped into and allowed to settle in the hold of the ship and excess water decanted off to leave a settled material in the form of a nonshifting cargo. At the destination the settled material is pulped to form a pumpable slurry by application of water and vigorous agitation. The slurry so formed is then pumped out of the ship through suitable piping.

CROSS REFERENCES TO RELATED APPLICATIONS

Reference is made to copending patent applications entitled:

(1) Ore Carrier With Slurry Repulping & Unloading System, Ser. No. 796,730 filed Feb. 5, 1969.
(2) Method and Apparatus for the Storage and Pulping of Mineral Ores and Comparable Particulate Matter, Ser. No. 863,001 filed July 10, 1969.
(3) Slurry System for Ship Transportation of Mineral Ores and Other Particulate Matter, Ser. No. 827,300 filed May 23, 1969.

Each of the above applications is assigned to an assignee in common with the present application and these applications disclose various methods and apparatus which are improvements to the present invention and are to be considered as comprehended within the scope hereof.

BACKGROUND OF THE INVENTION

Many mineral resources or ore bodies are located large distances from the point at which it is desired to recover their values. It is common practice, therefore, to subject a mine output to dressing at the site of the resource or body to form discrete or particulate material, and subsequently to transport this material to a mill or other destination by ship for further processing. Such ships may utilize storage and dry loading facilities and suitable unloading facilities such as clam shell discharging equipment at the destination. In general, the loading and discharging procedures involve essentially land based, dockside operations. That is to say, minerals are loaded or discharged from the ship in conjunction with equipment suitable mainly for land based operation. At the present time, there are many mineral bodies situated without convenient land based port facilities to which ships can dock. Similarly, many mills or other destinations are located at sites which are not entirely suitable for or accessible to large ocean going ships, particularly the newer super-cargo ships which have very deep drafts. In the loading and unloading of large ships, or where there is no suitable port facility, it has been necessary to use lighters or other batch loading and discharging equipment to transport material from shore to a suitable ship anchorage with attendant high cost of operation. In general, it is recognized that the loading and unloading of minerals is a difficult and time consuming operation that adds considerable to overall handling costs. There is, therefore, a need for a new and improved method and apparatus for shipping mineral solids and other comparable particulate matter.

SUMMARY OF THE INVENTION AND OBJECTS

This invention relates to methods and apparatus for shipping mineral solids and more particularly to the loading, handling and discharging of ore solids and other comparable particulate matter from ships.

It is a general object of the present invention to provide a new method and apparatus for shipping discrete particulate mineral solids and comparable particulate material, which overcome the above named disadvantages and limitations and which is particularly suitable for handling compacted, nonflowable minerals such as ore concentrates.

Another object is to provide an overall system for shipping and handling materials in which the material is loaded and discharged from ships in slurry form through suitable piping.

Another object of the present invention is to provide a method and apparatus of the above character which is particularly effective in pulping settled mineral particles into a slurry of pumpable consistency.

Another object of the present invention is to provide a mineral or ore shipping method and apparatus of the above character which does not require the use of traditional land based port installations.

Another object of the present invention is to provide a mineral or ore shipping method and apparatus of the above character which lends itself to large volume operations and which is capable of being expanded at reasonable cost.

The present invention involves the handling and storage of a material (e.g. mineral or ore) in discrete or particulate form. The material is pulped with water to form a slurry of pumpable consistency, and then the slurry is pumped through piping to the hold or storage vessel of a ship where the solids of the slurry are permitted to settle. The upper water fraction is removed by decantation, leaving the settled solids in the form of a compact, nonshifting cargo mass. At the destination the mass is pulped with water to form a pumpable slurry which is pumped from the ship through suitable piping for further processing.

The terms "discrete minerals" or "particulate minerals," as used herein, mean various ores, dressed ores, and ore concentrates in particulate form and of such a size or range of sizes that they can be pulped with water to form a pumpable slurry which, after gravity settlement, forms a compacted, nonshifting mass. After being subsequently subjected to a ship's motion and vibration, such settled solids become nearly impenetrable and constitute a compacted mass having the character of a solid. This compacted mass is further characterized by the resistance it presents to becoming resuspended. It is a nonflowing, substantially impervious material, the structure of which can be attributed to a combination of the fineness of the particles having range of particle sizes which permits the filling of voids, and high density.

A suitable apparatus is provided for carrying out the method and consists of an ore carrier having substantially watertight holds and means for pulping settled solid mass. The latter may include water jets, a sonic resonator and coupling element capable of simultaneously delivering their output within a zone of water and settled material. A slurry piping and pumping system is suitable arranged to pump slurry out of the ship. Considerable latitude in piping location is permitted including location at offshore facilities similar to those in use as offshore oil terminals for large tankers.

These and other features and objects of the invention will become apparent from the following description in which the preferred embodiments are set forth in detail, when taken in conjunction with the accompanying drawings.

BRIEF DESCRIPTION OF THE DRAWINGS

FIG. 1 is a flow sheet depicting the procedure of carrying out the present invention.

FIG. 2 is a perspective view of a ship constructed for use with the present invention.

DETAILED DESCRIPTION OF THE PREFERRED EMBODIMENTS

Figure 3:
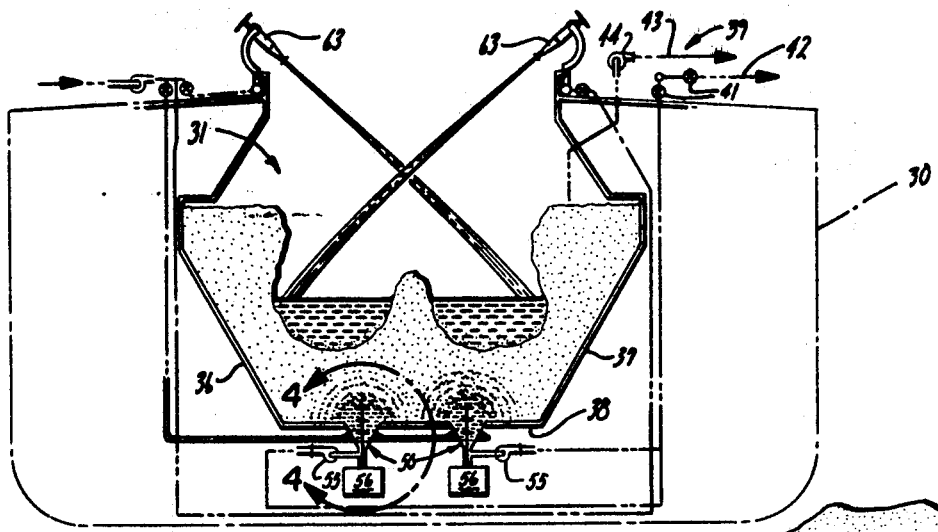
FIG. 3 is a cross sectional view of a ship's hold taken along the lines 3—3 of FIG. 2 and shows one form of apparatus for carrying out the invention.

Referring to FIG. 1, there is shown a flow sheet illustrating the procedure of the present invention. In step 11 the mineral solids are dressed by known procedures including subdivision to a size suitable for forming a slurry. For iron ore (e.g. magnetite) concentrate, a particle size of about 75% less than 325 mesh, for example, is satisfactory. A desirable quantity of water is added and mixed together with the dressed mineral solids in step 12 to form a pumpable slurry having a high solids content, the amount of water being limited so that a minimum amount of excess water will later have to be removed. A solids content for magnetite-water systems of about 70% or less has been found satisfactory for this purpose, although a solids content up to about 80% can be used. Above this range, the flow properties become undesirable until, at about 90% solids, a magnetite-water mixture begins to behave like a solid.

In step 13, the slurry is pumped through suitable piping into holds of a ship. Such piping can be of a flexible type which can be laid over terrain or can be submerged, as hereinafter described. In the holds, the slurry is permitted to settle (step 14) yielding an upper fraction or layer of essentially clear, excess water overlying a settled, more concentrated fraction of solids. The water layer is decanted off in step 16 as by drawing or pumping it off of the top of the settled solids fraction.

In order to promote the densification and settling of the slurry, sonic vibrations can be applied (step 17) and the frequency of such vibrations is preferably adjusted to promote the rate of settling. In some situations it may be desirable for the steps of loading, settling and decanting to be cycled between different holds or sequentially in the same hold so that the decanted water can be removed while maintaining control over ship's trim and cargo distribution.

After loading, densification and decanting, the settled solids and remaining water take the form of a substantially nonshifting cargo which is then transported, in step 18, to destination, in the course of which the ship's vibrations tend to settle the material into an even more dense, caked form which is difficult to reconstitute into a slurry.

At destination, the settled and compacted solids are pulped to form a slurry of pumpable consistency by adding water and vigorously agitating a zone containing the solids and water (step 19). Such vigorous agitation can be obtained by applying high energy water streams or jets to the zone together with sonic vibrations in such a manner that the energy of these agitations simultaneously impinges upon the water solid interface and causes the solids particles to be loosened and resuspended into slurry form.

The simultaneous action of the water jets and sound vibrations applied to the zone of caked material and water appears to cause minute separations between particles which are penetrated by the action of the water streams, causing fracture, crumbling, and general disintegration of the cake while the sonic vibrations further tend to disperse the particles of material into the water to form a slurry. Suitable means is provided for pumping the slurry ashore in step 20.

The energy content and frequency of the vibrations may be adjusted to obtain maximum disturbance and coupling into the settled solids. In general, a range of suitable frequencies lies between about 90 to 200 cycles per second, although frequencies widely outside this range may be used. Water jets or streams operating under a pressure head of about 200 pounds per square inch provide adequate stream velocity.

Figure 4:
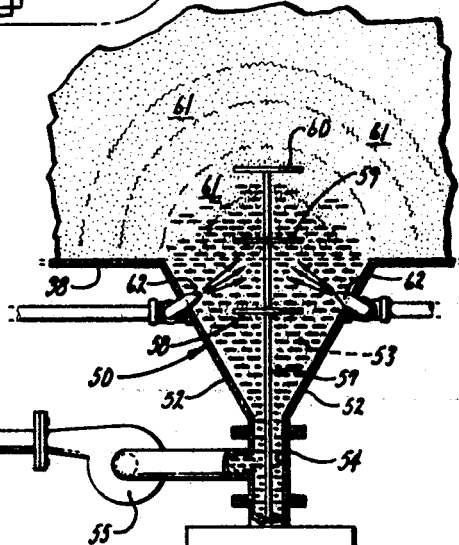
FIG. 4 is a detailed view taken along the lines 4—4 of FIG. 3.

Suitable apparatus for carrying out the invention is depicted in FIGS. 2 through 4 and includes a ship 30 having a plurality of watertight holds 31, 32 and 33 formed by transverse bulkheads 34, longitudinal bulkheads 36, 37, and inner bottom 38. A slurry distribution manifold 39 is provided and includes suitable valving 41 for selectively routing the slurry received from or delivered to inlet/discharge pipe 42 to various of the holds. A water discharge line 43 and pump 44 are provided for removing water from the settled solids. The ship is shown as anchored at a suitable offshore pumping station 45 served by a submerged pipeline 46 connected to pipe 42 so that the conventional port and loading facilities are not required. It is to be understood, however, that the ship could be serviced at conventional port facilities or in any other convenient manner and that many of the advantages of the invention would still enure due to the speed and high capacity of the slurry loading and discharge system disclosed herein.

Means are provided for pumping slurry out of the holds and includes a plurality of sumps 50 which are shown in greater detail in FIGS. 3 and 4. Each sump is formed of side and end walls 52, 53 connected to the inner bottom and converging downwardly into a sump outlet 54. The sump outlet is connected to a slurry sump 55 and thence to discharge line 42.

The means shown for vigorously agitating the material to promote reslurrying consists of a sonic resonator drive 56 which is coupled to a vibrator coupling element which can take the form of a rod 57 provided with transverse disc-like fins 58, 59, 60 spaced therealong for enhancing coupling of mechanical vibration to the zone 61 surrounding the element. For convenience, the resonator drive 56 is located immediately below the sump outlet 54 and the coupling element passes upwardly through the outlet and into the zone 61 immediately above it. A plurality of water jet nozzles 62 are shown mounted on the walls of the sump and oriented to direct high pressure water streams into zone 61, so that the water jets and sonic action are simultaneously applied to the material within the zone.

In operation the slurry being loaded is pumped from station 45 aboard the ship and allowed to settle, leaving an upper layer of excess water. The water pump and line 43, 44 are then used to pump out the layer of water and to leave a substantially solid, non-shifting mass of solids which is transported to destination.

In the discharge operation, the resonator drive 56 is activated to apply vibrations to the sonic coupling element 57 while simultaneously supplying the required water, as through the water jet nozzles 62. Additional water can be supplied from above as necessary. The compacted material within the zone 61 of agitation is suspended into a slurry which drains into the sump and the pump 55. As the supply of material in the intake of zone of agitation might eventually be exhausted due to bridging of the densely compacted material above it, it is desirable to include not only the high pressure water jets 62, but also additional high pressure water monitors 63 installed at deck level which can be directed into the hold to supply additional water and simultaneously cut away compacted mineral solids until they move into the vicinity of the sump.

Figure 5:
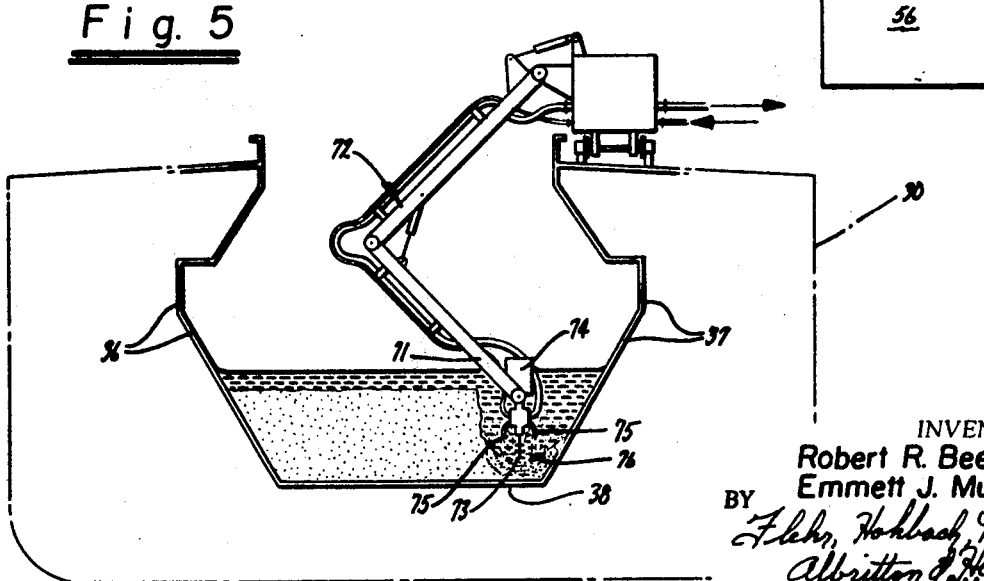
FIG. 5 is a cross sectional view of a ship's hold similar to that of FIG. 3 and shows another form of apparatus for carrying out the invention.

While there has been shown application of a sonic vibration centrally within a slurry sump located immediately below any communication with material above the inner bottom of the hold, other configurations can be used. For example, the sonic tool may be placed in other locations in the immediate vicinity of a sump and be focused so as to maximize energy at the sump or the entire operation may be conducted from above by utilizing suitable eductor or centrifugal pump mechanism. The latter arrangement is shown in FIG. 5 in which a pump 70 is installed at the lower end 71 of the hydraulically movable articulated boom 72. A sonic coupling element 73 and resonator drive 74 similar to that previously described are mounted at the end 71 together with water jet nozzles 75. Both the resonator drive element 74 and the nozzles 75 are arranged to agitate a zone 76 immediately below the end of the boom for resuspending material in the vicinity of the pump. This arrangement operates along the surface or face of settled material in a region where free water is available so that with movement of the arm, resuspension of compacted material in the immediate vicinity of the vibrating element causes such material to be resuspended for removal by the pump 70.

Thus, there has been provided a novel and useful system for handling and shipping mineral solids which permits fast economical loading and unloading in slurry form. The system of this invention is capable of complete slurry operation, even with difficult solids such as compacted ore cake and the like, and facilitates operation from offshore pumping stations with deep draft vessels. While preferred methods and apparatus have been disclosed herein, it is to be understood that certain departures from these disclosures can be practiced without departing from the spirit and scope of the invention which is limited only by the appended claims.

We claim:

1. In a method for the transportation of particulate ore solids by ship, the steps of dressing said ore solids to a range of particle sizes suitable for pulping into a consistency of a pumpable slurry, adding water to said dressed ore solids and mixing to form a pumpable slurry of high solids content, pumping said slurry into a hold of said ship through a pipeline, permitting said slurry to settle in said hold to yield an upper friction of excess water overlying settled solids, decanting the water off the top of the settled solids, continuing the steps of pumping slurry aboard said hold settling and decanting until said ship is loaded with a mass of settled mineral solids forming a substantially non-shifting cargo of low water content, moving said ship to a destination, unloading the ship by directing high pressure stream of water having a head greater than 200 p.s.i. to a zone within said mass and pulping the solids and water in said zone by applying sonic vibrations thereto together with said high velocity water stream in such a manner that the energies of sonic vibrations and the water stream simultaneously impinge upon the solids in said zone and cooperate in separating and repulping said solids into a slurry of pumpable consistency, and high solids content, pumping said slurry off of the vessel as it is formed through a pipeline, continuing the appliation of high pressure water and pulping while continuously removing slurry so formed until the hold is emptied whereby said hold can be loaded and unloaded by pipeline conveyed slurry.

2. A method as in claim 1 wherein said agitation consists of sonic vibrations in a range of from about 90 to 200 cycles per second.

3. A method as in claim 1 further including the step of promoting the settling of the slurry by applying sonic vibrations thereto.

4. In a method for the transportation of particulate ore solids by ship, the steps of dressing said ore solids to a range of particle sizes suitable for pulping into a consistency of a pumpable slurry, adding water to said dressed ore solids and mixing to form a pumpable slurry of high solids content, pumping said slurry into a hold of said ship through a pipeline, permitting said slurry to settle in said hold to yield an upper fraction of excess water overlying settled solids, decanting the water off the top of the settled solids, continuing the steps of pumping slurry aboard said hold settling and decanting until said ship is loaded with a mass of settled mineral solids forming a substantially non-shifting cargo of low water content, moving said ship to a destination, unloading the ship by directing high pressure stream of water having a head greater than 200 p.s.i. to a zone within said mass and pulping the solids and water into a slurry of pumpable consistency and high solids content, pumping said slurry off of the vessel as it is formed through a pipeline, continuing the application of high pressure water and pulping while continuously removing slurry so formed until the hold is emptied whereby said hold can be loaded and unloaded by pipeline conveyed slurry.

5. An apparatus for the transportation of particulate ore mineral solids by ship said solids being dressed to a range of particle sizes suitable for forming a pulp having a consistency of a pumpable slurry when mixed with water and having high solids content, said ship including means forming a plurality of watertight cargo holds therein for receiving said slurry and defined by transverse bulkheads, longitudinal bulkheads, and an inner bottom, means including a liquid pump arranged for access within said hold for decanting excess liquid overlying settled slurry so that said slurry can be dewatered after settling under gravity to a substantially non-shifting cargo, at least one slurry sump formed in said inner bottom of each hold by walls converging downwardly therefrom to an outlet, a slurry pump connected to said outlet, pulping means located in the vicinity of said sump for vigorously agitating and promoting repulping of surrounding settled solids into slurry form of pumpable consistency, said pulping means including a plurality of water nozzles positioned to direct high pressure water having a head in excess of 200 p.s.i. into material into solids in the vicinity of said sump.

6. Shipping apparatus as in claim 5 in which the water jets are located in said downwardly converging walls and directed upwardly above said sump.

7. Shipping apparatus as in claim 5 in which said means for agitating material includes a sonic resonator and means for conveying energy from said sonic resonator and coupling the same into a zone adjacent said pump inlet.

8. Shipping apparatus as in claim 5 further including monitor nozzles mounted at the level of the upper deck of said ship for aiding in dislodging or cutting compacted material by injecting high pressure water streams in such material.

9. In a mineral solids shipping apparatus for transporting such solids, a ship including means forming a plurality of watertight cargo holds therein for receiving slurry consisting of mineral solids suspended in a liquid, means forming a liquid pump arranged for access within each hold for decanting excess liquid overlying settled slurry, pump means having an inlet for pumping slurry out of each hold, means located in the vicinity of said inlet for vigorously agitating and promoting repulping of surrounding material into a slurry form of pumpable consistency, said last named means including a sonic resonator and a coupling element for transferring the output of said resonator to said material, an articulated boom having a lower end to which said slurry pump is attached, means mounting said boom for movement of the lower end thereof about said hold, said sonic resonator and coupling element being also carried by said boom for applying vibrations to material in the vicinity of said pump.

10. Apparatus as in claim 9 further including water jets attached to the end of said boom for delivering water streams to material in the vicinity of said pump simultaneously with said sonic vibrations.

References Cited

UNITED STATES PATENTS

| | | | |
|---|---|---|---|
| 512,865 | 1/1894 | Collins | 214—15B |
| 2,503,210 | 4/1950 | O'Halloran | 214—152 |
| 2,875,989 | 3/1959 | Toulmin, Jr. | |
| 2,884,147 | 4/1959 | Hunt et al. | 214—152 |
| 3,201,175 | 8/1965 | Keves et al. | 302—14 |
| 3,375,942 | 4/1968 | Boram | 302—14X |
| 689,741 | 12/1901 | McDougall | 114—26X |
| 3,305,106 | 2/1967 | Ishino | 214—14 |
| 3,445,008 | 5/1969 | Rock | 214—14 |

GERALD M. FORLENZA, Primary Examiner

F. E. WERNER, Assistant Examiner

U.S. Cl. X.R.

114—72; 214—15; 302—14; 214—152